Sept. 19, 1939.     E. E. BERRY ET AL     2,173,225
JOURNAL BEARING
Filed May 23, 1936     3 Sheets-Sheet 1
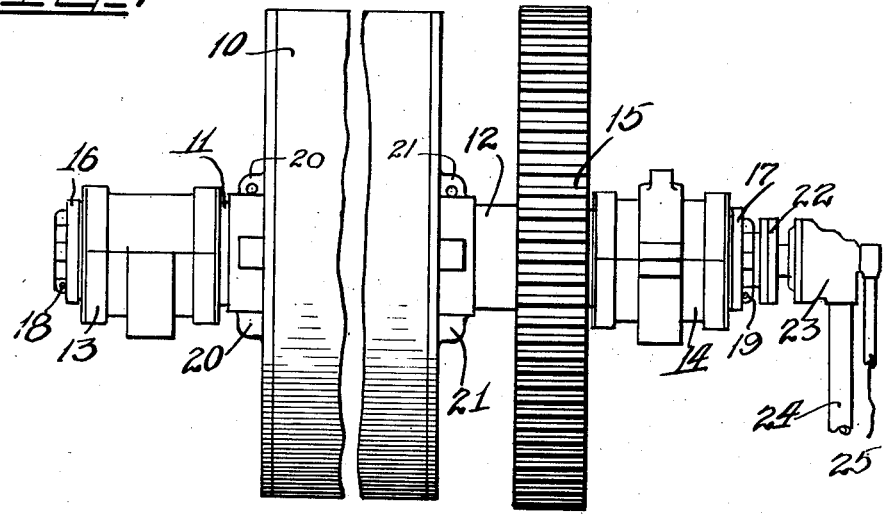
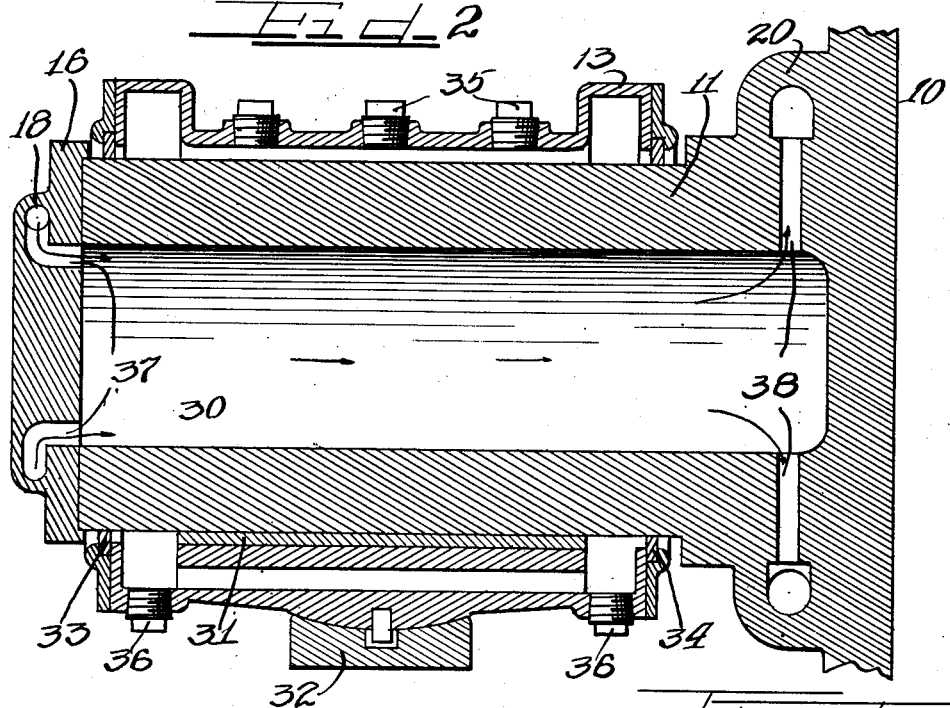
Inventors
Earl E. Berry
Lloyd Hornbostel

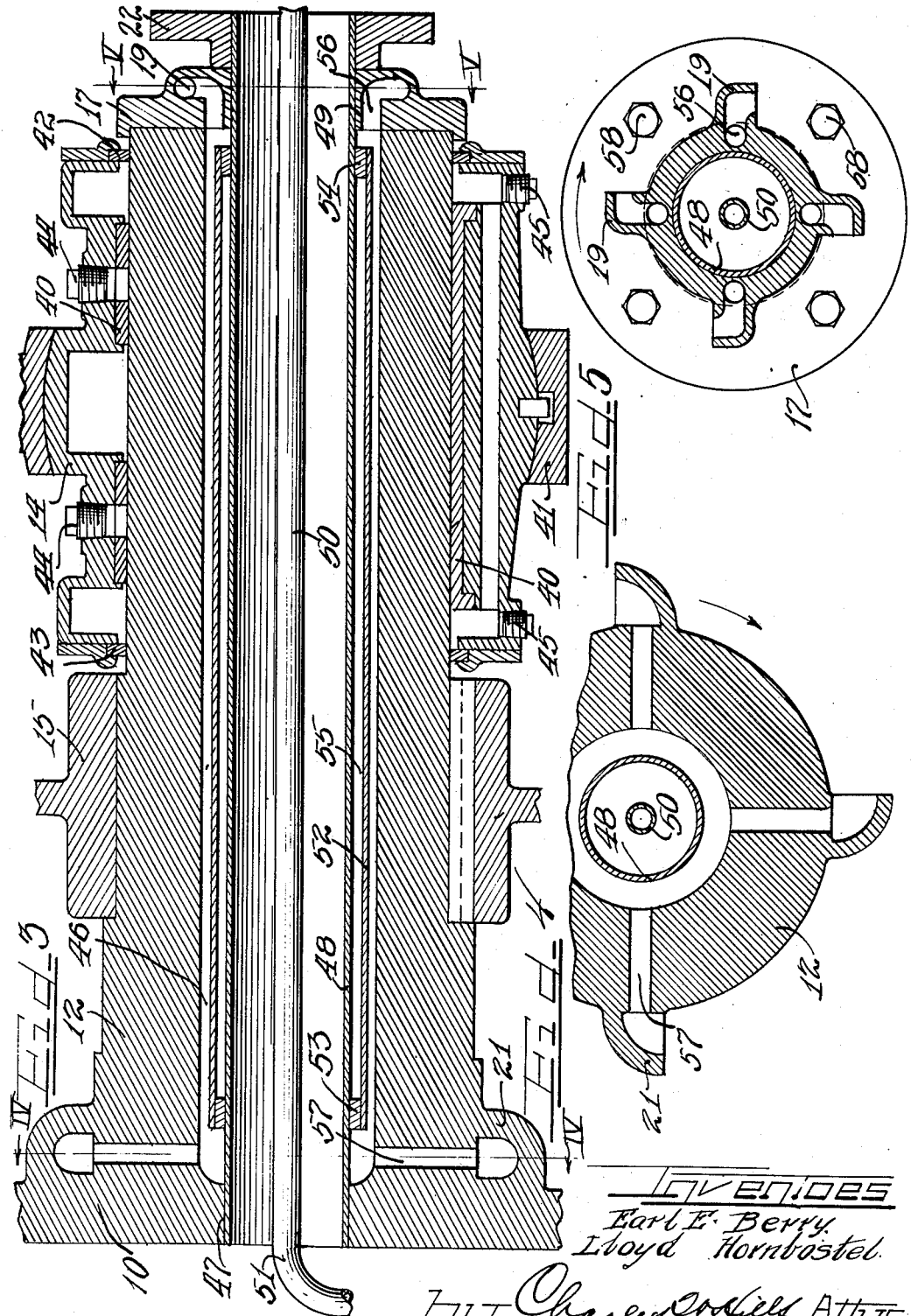

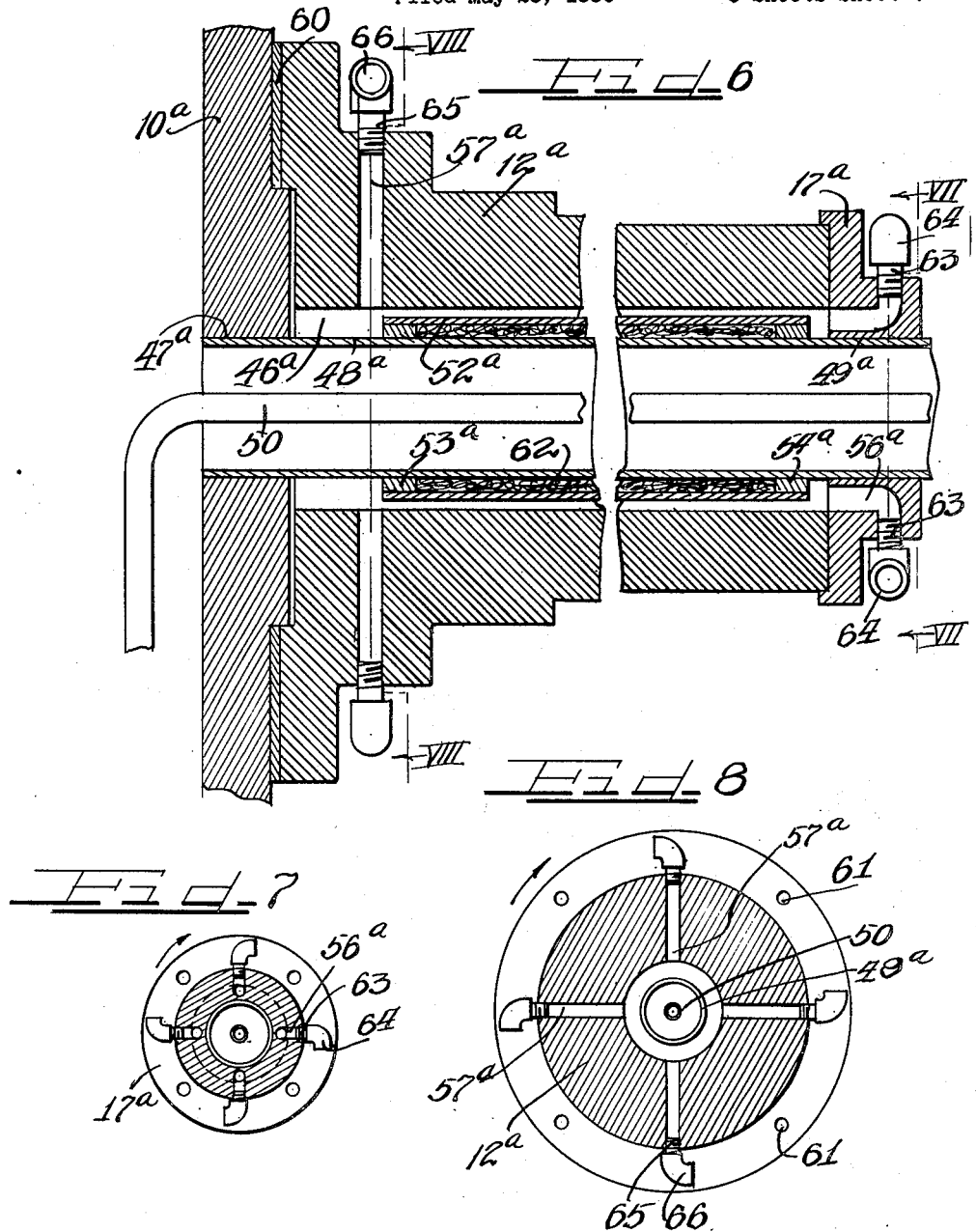

Patented Sept. 19, 1939

2,173,225

UNITED STATES PATENT OFFICE 2,173,225

JOURNAL BEARING

Earl E. Berry and Lloyd Hornbostel, Beloit, Wis., assignors to Beloit Iron Works, Beloit, Wis., a corporation of Wisconsin Application May 23, 1936, Serial No. 81,358

9 Claims. (Cl. 34—4)

This invention relates to the cooling of bearings to prevent mechanical failure and decomposition of lubricants.

More specifically this invention relates to air cooled journal bearings in which air is caused to flow through a hollow journal by fan devices provided on both ends of the journal which scoop up air surrounding the end of the journal and throw out the heated air passing through the journal.

The invention will be specifically described in connection with bearings for drier drums such as are used on paper machines to dry the paper. The bearings of such drier drums are subjected to high temperatures caused by feeding steam or other heating means into the drum. It should be understood, however, that the air cooled bearings of this invention are not limited for use on drier drums but can be used on any bearings which are subjected to elevated temperatures for cooling the bearings.

It is known that when a shaft, journal, or trunnion, which is rotatably mounted in a bearing, becomes rapidly heated, the same will expand faster than the bearing. This expansion will subject the bearing to great stresses which, in many cases, will rupture the races of the bearings. When roller bearings are used to mount the shaft or trunnion, a rapid heating of the shaft or trunnion will cause the same to expand faster than the bearing inner race and will cause this race to break or expand so as to jam the rollers. These bearing breakages and expansions are very serious drawbacks in the operation of paper machine drier drums since it is vitally important the the drier drum journals and bearings be kept in good shape to maintain a uniform draw of the paper web as it passes from one drum to another.

When the drier drum journals are not insulated and/or cooled, the bearings will run at very high temperatures due to heat transfer from the steam passed through the journals and to heat of friction. This creates a fire hazard as there is, commonly, sufficient paper or paper dust around the bearings which might be ignited by the hot bearings. Furthermore, a heating of the bearing tends to decrease the lubricating efficiency of oils or greases which might be packed in the bearing and thereby cause great frictional wear between the bearing parts.

We have now provided simple mechanism for maintaining the bearing cool by flowing a cooling fluid such as air through the journal mounted in the bearing. According to this invention, a set of elbows or air scoops are provided radially around each end portion of the journal. These elbows or air scoops open in opposite directions in each end of the journal so that one set of scoops will catch air as the journal is rotated while the other set of scoops will throw out the air passing through the journal. Each scoop is connected by a conduit or passageway to the central portion of the journal so that all of the air caught by the scoops will flow through the journal to cool the same.

It is then an object of this invention to provide a fluid cooled journal bearing.

Another object of this invention is to cool bearings by causing a rotating part thereof to scoop up surrounding air and direct this air through the bearing to cool the same.

A further object of this invention is to provide a journal bearing with air scoops on either end thereof for flowing air through the journal of the bearing to cool the same.

A specific object of this invention is to provide an air cooled journal bearing for drier drums.

Other and further objects of this invention will become apparent from the following description of the annexed sheets of drawings which disclose preferred embodiments of the invention.

On the drawings:

Figure 1 is a side elevational view, with a part broken away, of a drier drum having front and rear air cooled journal bearings according to this invention.

Figure 2 is an enlarged cross sectional view, with parts in elevation, of a front journal bearing for a drier drum as shown in Figure 1.

Figure 3 is an enlarged fragmentary cross sectional view, with parts shown in elevation, of a rear journal bearing of a drier drum such as is shown in Figure 1.

Figure 4 is a fragmentary cross sectional view taken substantially along the line IV—IV of Figure 3.

Figure 5 is a cross sectional view, with parts in elevation, taken substantially along the line V—V of Figure 3.

Figure 6 is a broken cross sectional view, with parts in elevation, of a modified form of journal for the rear side of a drier drum such as is shown in Figure 1.

Figure 7 is a cross sectional view, with parts in elevation, taken substantially along the line VII—VII of Figure 6.

Figure 8 is a cross sectional view, with parts in elevation, taken substantially along the line VIII—VIII of Figure 6.

As shown on the drawings:

In Figure 1, the reference numeral 10 indicates a drier drum having a front journal 11 and a rear journal 12 for rotatably supporting the drum. The front journal 11 is rotatably mounted in a bearing 13. The rear journal 12 is rotatably mounted in a bearing 14. The drum 10 is driven by a large gear 15 secured on the journal 12.

The journals 11 and 12 are hollow and are closed with end caps 16 and 17 respectively. The caps 16 and 17 have air scoops 18 and 19 mounted radially around the periphery thereof for scooping up air surrounding the cap, as the cap rotates with the journal. The journals 11 and 12 also have a set of air scoops 20 and 21 mounted around the periphery thereof at the ends adjacent the drier drum 10. These scoops open in opposite directions to the scoops 18 and 19, so that air picked up by the scoops 18 and 19 and flowed through the journals 11 and 12 is discharged from the journals through the scoops 20 and 21.

As is customary on drier drums the rear journal 12 thereof is coupled as at 22 to a steam header 23 for supplying the drier drum 10 with live steam from the steam line 24. The header 23 also contains a condensate tube for removing the condensed steam from the interior of the drier drum for discharge into a drain line 25.

As shown in Figure 2, the front journal 11 has a passageway 30 extending therethrough but is blocked off from the interior of the drum 10 by the side wall of the drum. The journal 11 floats freely through the bearing 13 and runs only along its bottom half on the bearing material, such as 31. The bearing 13 is carried in a pillow block 32 permitting tilting movement of the bearing. The bearing housing is sealed at the ends thereof by packing material 33 and 34 respectively, which prevents leakage of lubricant from the bearing. A plurality of lubricant plugs 35 and 36 are provided at the top and bottom respectively of the bearing housing.

The air scoops 18 of the end cap 16 communicate with passageways 37 thereby directing any air picked up by these scoops 18 into the passageway 30 of the journal. Likewise the air discharge means 20 on the drier drum end of the journal communicate with passageways 38 for directing air out of the journal passageway 30. As shown, the scoops 18 and 20 open in opposite directions, so that as the journal 11 rotates air is drawn into the air scoops 18, circulated through the passageway 30, and discharged through the air scoops 20. If the journal is rotated in the opposite direction, flow of air through the passageway 30 will be reversed. However, it is preferred to take the air in through the cap 16 for discharge adjacent to the drier drum, since the air adjacent the drier drum is hotter than the air adjacent to the cap 16.

In Figure 3, the rear journal 12 for the drier drum 10 is fully mounted in the bearing 14 and is surrounded entirely around its periphery by bearing material such as 40. The bearing 14 is carried in a pillow block 41, which is collared around the entire bearing housing as is shown. Thus, while front journal 11 floats through the bearing 13, the rear journal 12 is mounted in bearing material at its top portion, as well as the bottom portion thereof. The bearing 14 is sealed at each end by packing material 42 and 43 and contains a plurality of lubricant plugs 44 and 45 at the top and bottom thereof respectively for lubricating the bearing material 40.

The journal 12 contains a passageway 46 extending entirely through the journal but having a reduced neck portion 47 at the drier drum end thereof. A tube or pipe 48 extends through the passageway 46 in spaced relation from the walls thereof but is seated in the reduced neck portion 47 thereof at the drier drum end and in a supporting portion 49 of the cap 17 at the other end of the journal. The pipe 48 is directly coupled with the steam pipe from the header 23 described in Figure 1 and directs the steam into the interior of the drier drum. A condensed steam return tube 50 extends through the pipe 48 into the dried drum 10 where it is bent as shown at 51 for extending into the bottom portion of the drum. The tube 50 communicates directly with the condensate drain line 25 described in Figure 1.

The pipe 48 is preferably enclosed, in the passageway 46, in a larger tube 52 spaced from the outside of the pipe by means of collars 53 and 54. The cover tube 52, the inner pipe 48, and the collars 53 and 54 define a dead air space 55 to insulate the pipe 48. If desired, as will be hereinafter illustrated, the dead air space 55 can be filled with insulating or lagging material.

As described above in connection with Figure 1, the end cap 17 for the journal 12 has air scoops 19 formed thereon for directing air surrounding the cap through passageways 56 formed in the cap. The passageways 56 communicate with the passageway 46 through the journal 12, so that air picked up by the cap flows through the passageway 46. The other end of the journal is provided with air discharge means 21. These means 21 have passageways 57 communicating with the passageway 46 for directing air from the passageway 46 out through the discharge means 21.

As better shown in Figure 4, the air discharge means 21 are cast integrally onto the journal bearing 12, while the passageways 57 from the air discharge means 21 are drilled through the journal 12.

As shown in Figure 5, the end cap 17 is bolted onto the journal 12 by means of bolts 58, and the air scoops 19 thereon are cast integrally with the cap. A comparison of the discharge means 21 in Figure 4 with the air scoops 19 in Figure 5 will show that these means open in opposite directions, so that a clockwise rotation of the journal 12 will cause the scoops 19 to pick up air surrounding the cap 17 for flowing through the passageway 46, while the same rotation of the journal will cause the air discharge means 21 to draw the air from the passageway 46. Thus, at all times during the rotation of the journal 12 air is continually flowed therethrough for cooling the journal.

One of the features of this invention includes the provision of a separate steam passageway provided by the pipe 48 through the passageway 46 of the journal. Heretofore, it was customary to discharge the steam from the steam header 23 directly into the passageway formed in the rear journal of the drier drum. Therefore, the structure shown in Figure 3 provides two separate but concurrently functioning devices for maintaining the journal 12 in a cooled condition to prevent mechanical failure of the bearing 14.

In the constructions described in Figures 1 to 5 inclusive the journals are integral with the drier drum and therefore can receive heat from the drier drum by conduction. If it is desired to further insulate these journals, the same can be made separate from the drier drum, as illustrated in Figures 6 to 8.

In Figure 6, the reference numeral 10a indicates a drier drum of similar construction to that described in Figure 1 but having a rear journal 12a thereon separated therefrom by an insulating gasket 60. As shown in Figure 8, the journal 12a is bolted to the dried drum 10a by means of bolts 61. The insulating gasket 60 between the journal 12a and the dried drum 10a prevents a heating of the journal by direct conduction from the drum to the journal.

The rear journal 12a receives a pipe 48a therethrough seated at one end in an aperture 47a formed in the side wall of the drier drum and at the other end in a portion 49a of the end cap 17a. The pipe 48a is covered, in the passageway 46a of the journal, by a larger pipe 52a and is held in spaced relation from the pipe 52a by collars 53a and 54a. The space between the pipes 48a and 52a and the collars 53a and 54a is filled wtih an insulating or lagging material 62.

In the constructions shown in Figures 1 to 5, the air scoops 18 and 19 and the air discharge means 20 and 21 are cast integrally on the caps 16 and 17 and on the drier drum ends of the journals 11 and 12 respectively. However, in the structure shown in Figures 6 to 8, the same effect is obtained by threading the ends of the passageways 56a of the cap 17a for receiving nipples 63 therein which have elbows 64 threaded on the other ends thereof. Likewise the passageways 57a of the journal 12a are threaded to receive nipples 65 therein having elbows 66 threaded on the other ends thereof. The elbows 64 and 66 open in opposite directions around the periphery of the cap 17a and journal 12a respectively. Thus, when the journal 12a is rotated in a clockwise direction, air is scooped up by the elbows 64 and is flowed through the passageway 46a of the journal for discharge through the passageway 57a. The discharge is aided by the suction effect created by the elbows 66. If the journal is rotated in a counterclockwise direction, air is scooped up by the elbows 66 for discharge through the elbows 64.

It should be understood that while the bearings illustrated in Figures 2 and 3 are of the plain type, antifriction bearings can also be used in place of plain bearings. This invention is not limited to any particular form of bearing but relates broadly to the cooling of bearings in general, particularly to journal bearings, together with the cooling of the journals themselves to prevent mechanical failures and frictional losses.

We are aware that many changes may be made and numerous details of construction may be varied through a wide range without departing from the principles of this invention, and we, therefore, do not propose limiting the patent granted hereon otherwise than as stated in the following claims.

We claim as our invention:

1. In combination, a hollow drier drum, a hollow rear journal projecting from the central portion of one side of the drum, said rear journal communicating with the interior of the drum, a bearing for rotatably supporting the journal, a steam pipe extending to the drum interior through the rear journal in spaced relation to said journal, said steam pipe communicating with the interior of the drum, a seal on the side of the drum surrounding the drum end of the steam pipe to seat the pipe and seal the space between the pipe and the journal from the interior of the drum, a condensate conduit extending through the steam pipe and means insulating the steam pipe from the journal.

2. In combination, a hollow drier drum having a cylindrical periphery and side walls, front and rear hollow journals projecting from the central portion of the side walls of the drum, bearings for rotatably supporting the journals, said rear journal communicating with the interior of the drum, a steam pipe extending through the rear journal in spaced relation therefrom and snugly seated in the side of the drum, the interior of said steam pipe being in communication with the interior of the drum, and a condensate conduit extending through the steam pipe whereby steam can be fed to and removed from the interior of the drum through said rear journal without contacting and unduly heating the journal.

3. In combination, a hollow drier drum having a cylindrical periphery and side walls, journals mounted on said side walls, insulating gaskets interposed between said journals and said side walls, bearings for rotatably supporting the journals, said rear journal having a passageway extending therethrough, an insulated steam pipe extending through the rear journal in communication with the interior of the drum in spaced relation from the walls defining the passageway in the rear journal, and said side wall of the drum adjacent said rear journal having a reduced passageway therethrough for snugly seating the steam pipe to seal the interior of the drum from the space between the steam pipe and the rear journal.

4. Rear journal bearing structure for drier drums comprising a shaft having a passageway therethrough with a reduced end portion communicating with the interior of the drum, a steam pipe snugly fitting in said reduced end portion and extending through the shaft in spaced relation from the walls defining the passageway therein, an end cap for said shaft supporting the other end of the steam pipe and a bearing surrounding the shaft to rotatably support the shaft whereby hot steam can be fed to the drum through the shaft in spaced relation from the shaft and steam in the drum cannot contact the shaft.

5. In combination, a hollow drum, a trunnion projecting from the central portion of one side of the drum having a passageway therethrough with a reduced end portion in communication with the interior of the drum, a steam pipe extending through said passageway in spaced relation from the walls thereof and snugly seated in the reduced end portion, an end cap for said trunnion supporting the other end of the steam pipe, said end cap being rotatable with the trunnion, air scoops projecting radially from said cap having the mouths thereof opening in the direction of rotation of the trunnion, passageways from said air scoops to said passageway through the trunnion, and air discharge passageways communicating with the other end of the trunnion passageway whereby a rotation of the trunnion effects a flowing of air therethrough to cool the trunnion.

6. In combination, a hollow drum having side walls, trunnions extending from the side walls of the drum for rotatably supporting the drum, one of said trunnions having a bore longitudinally therethrough, the side wall of the drum adjacent the bored out trunnion having a reduced passageway therethrough joining the bore with the interior of the drum, a steam pipe extending through said bore in spaced relation from the trunnion and snugly seated in said reduced passageway for supplying steam to heat the drum, a condensate pipe extending through the steam pipe for removing condensate from the drum, insulation between the steam pipe and the trunnion whereby steam is supplied through the trunnion for heating the drum and condensate is removed from the drum through the trunnion without contacting the trunnion and without substantial heating of the trunnion.

7. In combination, a hollow drier drum having side walls, journals projecting from the central portions of the side walls of the drum, bearings rotatably supporting the journals, at least one of said journals having a longitudinal bore therethrough, the wall of the drum adjacent the bored journal having a reduced passageway therethrough joining the bore with the interior of the drum, telescoped pipes extending through said bore into communication with the interior of the drum in spaced relation from the walls of the bore, the exterior pipe of said telescoped pipes being snugly seated in said reduced passageway, insulation between said exterior pipe and the journal, means for supplying a heating fluid through one of said pipes for heating the drum and means for removing the spent uid in the drum through the other of said pipes whereby the drum is heated with fluid supplied thereto and exhausted therefrom through a journal thereof without substantial heating or expansion of the journal and the journal bearing is kept cool and in proper bearing engagement with the journal.

8. In combination, a drum having a chamber therein adapted to receive a fluid, a hollow trunnion projecting from the central portion of one side of the drum, said trunnion communicating with said chamber in the drum, a bearing for rotatably supporting the trunnion, a pipe extending to the chamber in the drum through the trunnion in spaced relation from the trunnion, said pipe being in communication with the chamber, means surrounding the drum end of the pipe to seat the pipe and seal the space between the pipe and the trunnion from the chamber in the drum and a second pipe extending through said first mentioned pipe and communicating with the chamber in the drum whereby fluid may be supplied to and removed from said chamber through the hollow trunnion without contacting the trunnion.

9. In combination, a hollow drier drum having an axially apertured end wall, a separate hollow trunnion attached to said end wall to project axially from the drum, the interior of said trunnion being in alignment with the aperture in said end wall, a heat insulating gasket mounted between the drum end of the trunnion and said end wall to eliminate extended direct contact of the trunnion with the drum, a bearing disposed around the trunnion for rotatably supporting the drum, a steam pipe extending to the drum interior through the trunnion in spaced relation from the trunnion, said steam pipe communicating with the interior of the drum, the drum end of the steam pipe being seated and sealed in the aperture of the end of the drum whereby the space between the pipe and the trunnion is sealed from the interior of the drum, and a condensate conduit extending through the steam pipe into the interior of the drum for removing condensate from the drum.

EARL E. BERRY.
LLOYD HORNBOSTEL.